United States Patent
Kim et al.

(10) Patent No.: US 9,935,700 B2
(45) Date of Patent: Apr. 3, 2018

(54) BEAM SCANNING METHOD FOR HYBRID BEAMFORMING IN WIRELESS COMMUNICATION SYSTEM AND APPARATUS THEREFOR

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/318,287

(22) PCT Filed: Sep. 3, 2014

(86) PCT No.: PCT/KR2014/008254
§ 371 (c)(1),
(2) Date: Dec. 12, 2016

(87) PCT Pub. No.: WO2015/190648
PCT Pub. Date: Dec. 17, 2015

(65) Prior Publication Data
US 2017/0134083 A1 May 11, 2017

Related U.S. Application Data

(60) Provisional application No. 62/011,043, filed on Jun. 12, 2014.

(51) Int. Cl.
*H04B 7/04* (2017.01)
*H04B 7/06* (2006.01)
(Continued)

(52) U.S. Cl.
CPC ......... *H04B 7/0617* (2013.01); *H04B 7/0417* (2013.01); *H04B 7/0456* (2013.01); *H04B 7/0695* (2013.01)

(58) Field of Classification Search
CPC .. H04B 7/0617; H04B 7/0417; H04B 7/0639; H04B 7/0634; H04B 7/0456;
(Continued)

(56) References Cited

U.S. PATENT DOCUMENTS

2004/0147287 A1* 7/2004 Nelson, Jr. ............... H01Q 3/26
455/561
2013/0051364 A1 2/2013 Seol et al.
(Continued)

FOREIGN PATENT DOCUMENTS

WO 2014011117 1/2014

OTHER PUBLICATIONS

PCT International Application No. PCT/KR2014/008254, Notification of Transmittal of the International Search Report and the Written Opinion of the International Searching Authority, or Declaration dated Feb. 11, 2015, 12 pages.

*Primary Examiner* — Michelle M Koeth
(74) *Attorney, Agent, or Firm* — Lee, Hong, Degerman, Kang & Waimey

(57) ABSTRACT

A method for, at a transmitter, transmitting a signal to a receiver in a wireless communication system is disclosed. The method includes transmitting a first reference signal for omni-directionally providing a uniform reference beam to the receiver, transmitting a second reference signal for providing beams respectively corresponding to a predetermined number of sectors to the receiver, receiving, from the receiver, sector information selected based on the second reference signal and information about a beam gain difference between a beam corresponding to the selected sector
(Continued)

and the reference beam, and performing beamforming for transmitting a signal to the receiver based on the sector information and the information about the beam gain difference.

8 Claims, 12 Drawing Sheets

(51) Int. Cl.
*H04B 7/0456* (2017.01)
*H04B 7/0417* (2017.01)

(58) Field of Classification Search
CPC ...... H04B 7/0695; H04B 7/086; H04B 7/088; H04B 7/0619; H04B 7/061; H04B 17/24; H04B 17/309; H04B 17/318; H04B 1/1027; H04W 16/28; H01Q 3/26; H01Q 3/2605; H01Q 3/30; H01Q 3/40; H01Q 21/061; H01Q 25/002
See application file for complete search history.

(56) References Cited

U.S. PATENT DOCUMENTS

| | | | | |
|---|---|---|---|---|
| 2013/0072247 A1* | 3/2013 | Park | .................... | H04B 7/0408 455/513 |
| 2013/0301454 A1* | 11/2013 | Seol | ..................... | H04B 7/043 370/252 |
| 2013/0301567 A1 | 11/2013 | Jeong et al. | | |
| 2014/0126620 A1 | 5/2014 | Maltsev et al. | | |
| 2014/0146863 A1 | 5/2014 | Seol et al. | | |
| 2014/0355707 A1* | 12/2014 | Kim | .................... | H04B 7/0469 375/267 |

* cited by examiner

BEAM SCANNING METHOD FOR HYBRID BEAMFORMING IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2014/008254, filed on Sep. 3, 2014, which claims the benefit of U.S. Provisional Application No. 62/011,043, filed on Jun. 12, 2014, the contents of which are hereby incorporated by reference herein in their entirety.

TECHNICAL FIELD

The present invention relates to a wireless communication system, and more particularly, to a beam scanning method for hybrid beamforming in a wireless communication system and an apparatus therefor.

BACKGROUND ART

Existing beamforming technology using multiple antennas may be classified into analog beamforming technology and digital beamforming technology according to a location where a beamforming weight vector/precoding vector is applied.

First, an analog beamforming scheme is a representative beamforming scheme applied to an initial multi-antenna structure, which branches analog signals subjected to digital signal processing into a plurality of paths to perform beamforming through a phase shifter (PS) and a power amplifier (PA) of each path. FIG. 1 shows a conventional analog beamforming scheme.

Referring to FIG. 1, for analog beamforming, an analog signal derived from a single digital signal is processed by a PA and a PS connected to each antenna. That is, in an analog stage, a complex weight is processed by the PS and the PA. Here, a radio frequency (RF) chain means a processing block for converting a single digital signal into an analog signal.

However, in the analog beamforming scheme, beam accuracy is determined according to element characteristics of the PS and the PA. In addition, the analog beamforming scheme is suitable for narrowband transmission due to control characteristics of the element. In contrast, due to a hardware structure in which it is difficult to implement multiple stream transmission, multiplexing gain for increase in transfer rate is relatively small. In addition, it is difficult to perform beamforming per user based on orthogonal resource assignment.

Next, in the digital beamforming scheme, unlike the analog beamforming scheme, beamforming is performed in a digital stage using a baseband processor in order to maximize diversity and multiplexing gain in a multiple input multiple output (MIMO) environment.

Referring to FIG. 2, precoding is performed in a baseband processor such that digital beamforming is possible. Unlike FIG. 1, an RF chain includes a PA, because a complex weight derived for beamforming is directly applied to transmitted data.

In addition, since different beamforming is performed per user, it is possible to simultaneously support multi-user beamforming. Since beamforming is independently performed per user, to which orthogonal resources are assigned, scheduling flexibility is high and a transmitter suitable for a system purpose can be employed. In addition, if technology such as MIMO-orthogonal frequency division multiplexing (OFDM) is applied in a wideband transmission environment, it is possible to form an independent beam per subcarrier. Accordingly, the digital beamforming scheme can maximize a transfer rate of a single user based on enhanced beam gain and system capacity enhancement.

In a current 3G/4G system, digital beamforming based MIMO technology has been introduced according to above-described merits and demerits.

DISCLOSURE

Technical Problem

An object of the present invention devised to solve the problem lies in a method for performing beamforming based on mobility in a wireless communication system and an apparatus therefor.

Technical Solution

The object of the present invention can be achieved by providing a method for, at a transmitter, transmitting a signal to a receiver in a wireless communication system including transmitting a first reference signal for omni-directionally providing a uniform reference beam to the receiver, transmitting a second reference signal for providing beams respectively corresponding to a predetermined number of sectors to the receiver, receiving, from the receiver, sector information selected based on the second reference signal and information about a beam gain difference between a beam corresponding to the selected sector and the reference beam, and performing beamforming for transmitting a signal to the receiver based on the sector information and the information about the beam gain difference.

The performing beamforming may include calculating predetermined precoding matrices based on the sector information and selecting one of the predetermined precoding matrices based on the information about the beam gain difference.

The predetermined precoding matrices may be used to adjust a phase shifter and a power amplifier included in an antenna of the transmitter.

The transmitting the first reference signal may include transmitting the first reference signal to the receiver if a channel quality change of the receiver is equal to or greater than a threshold.

The beam corresponding to the selected sector may be a beam for providing maximum beam gain among the beams corresponding to the predetermined number of sectors.

In another aspect of the present invention, provided herein is a method for, at a receiver, receiving a signal from a transmitter in a wireless communication system including receiving a first reference signal for omni-directionally providing a uniform reference beam from the transmitter and receiving a second reference signal for providing beams respectively corresponding to a predetermined number of sectors from the transmitter, selecting one of the predetermined number of sectors based on the first reference signal and the second reference signal, calculating a beam gain difference between a beam corresponding to the selected sector and the reference beam, transmitting information about the selected sector and information about the beam gain difference to the transmitter, and receiving a signal subjected to beamforming from the transmitter based on the information about the selected sector and the information about the beam gain difference.

The signal subjected beamforming may be a signal, to which one of a plurality of predetermined precoding matrices that are selected based on the information about the beam gain difference from among the predetermined precoding matrices calculated based on the information about the selected sector is applied.

The predetermined precoding matrices may be used to adjust a phase shifter and a power amplifier included in an antenna of the transmitter.

The method may further include transmitting information about a channel quality change to the transmitter, and the first reference signal may be transmitted from the transmitter if the channel quality change is equal to or greater than a threshold.

The selecting one of the predetermined number of sectors may include selecting a beam for providing maximum beam gain among the beams corresponding to the predetermined number of sectors.

Advantageous Effects

According to the embodiments of the present invention, it is possible to perform signal transmission and reception optimized for a radio channel state using a hybrid beamforming scheme. In particular, it is possible to remarkably decrease a beam scanning time for hybrid beamforming.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The configuration, operation and other features of the present invention will be understood by the embodiments of the present invention described with reference to the accompanying drawings.

First, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 1:
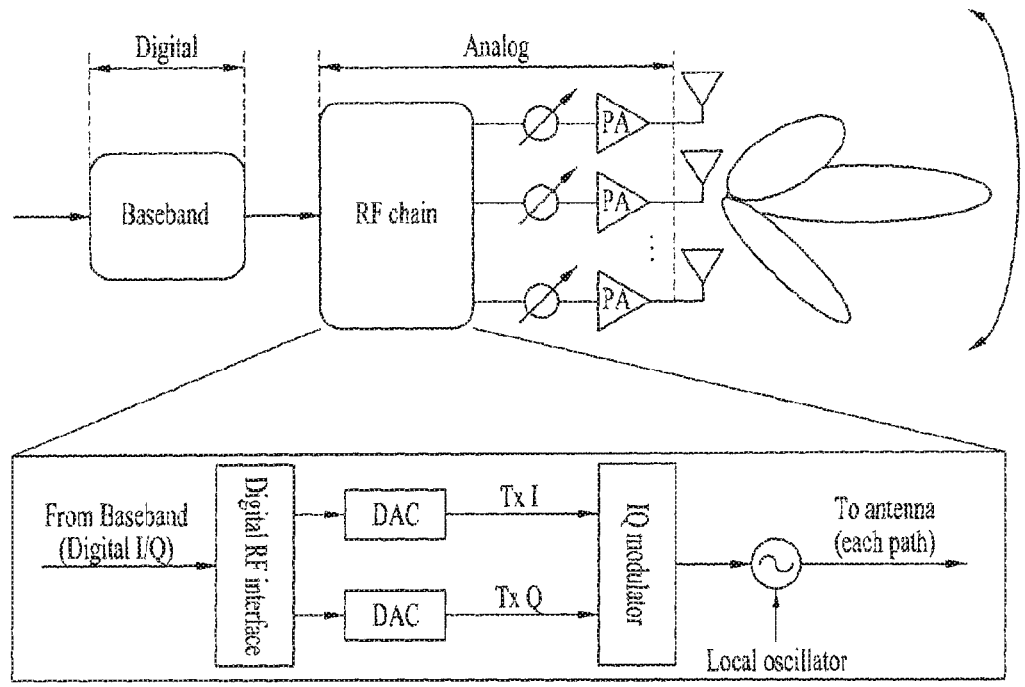
FIG. 1 is a diagram showing a conventional analog beamforming scheme.
Figure 2:
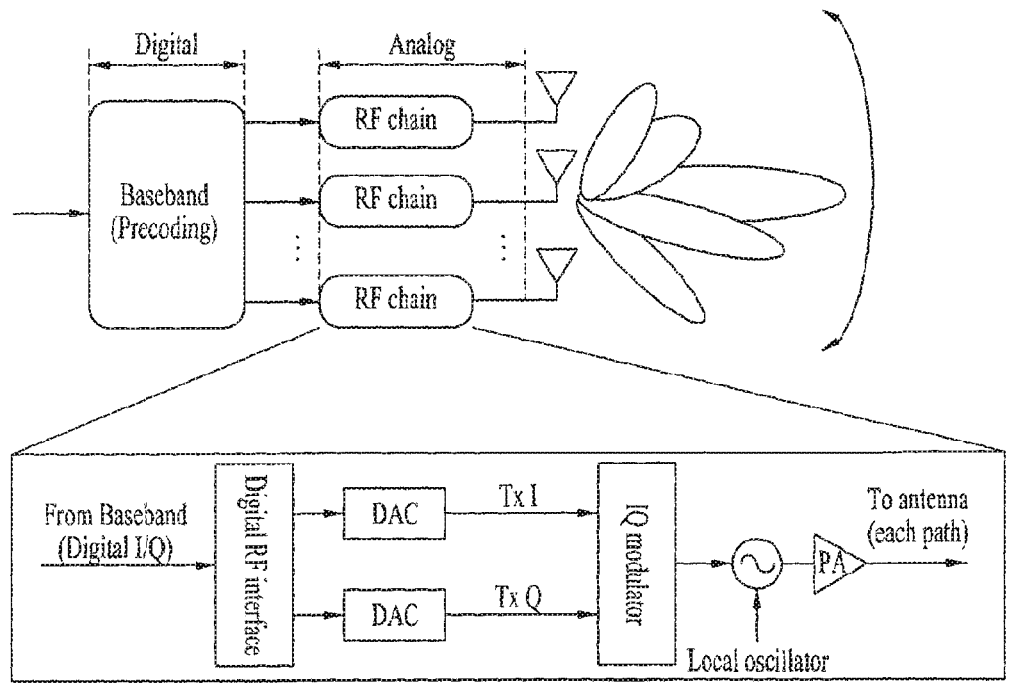
FIG. 2 is a diagram showing a conventional digital beamforming scheme.
Figure 3:
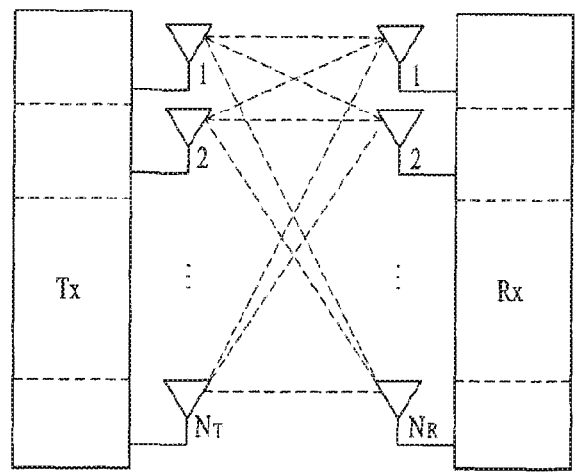
FIG. 3 is a diagram showing the configuration of a general MIMO system.

The configuration of the general multi-antenna (MIMO) communication system is shown in FIG. 3. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1. Here, $R_i$ is the smaller of the two values $N_T$ and $N_R$.

$$R_i = \min(N_T, N_R) \qquad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 3, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2.

$$s = [s_1, s_2, \ldots, s_{N_T}]^T \quad \text{[Equation 2]}$$

The transmitted information $S_1, S_2, \ldots, S_{N_T}$ may have different transmit powers. If the respective transmit powers are $P_1, P_2, \ldots, P_{N_T}$, the transmitted information with adjusted powers may be expressed by a vector shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be expressed using a diagonal matrix P of the transmit powers as shown in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Considers that the $N_T$ actually transmitted signals $x_1, x_2, \ldots, x_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \quad \text{[Equation 5]}$$

$$\begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank of the channel matrix H is mathematically expressed by Equation 6.

$$\text{rank}(H) \leq \min(N_T, N_R) \quad \text{[Equation 6]}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7.

$$\text{\# of streams} \leq \text{rank}(H) \leq \min(N_T, N_R) \quad \text{[Equation 7]}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

Next, a massive MIMO environment in which the number of transmit/receive antennas is significantly increased will be described. In general, in cellular communication, assume that a maximum number of transmit/receive antennas applied to the MIMO environment is 8. However, as massive MIMO has evolved, the number of antennas may be increased to several tens or several hundreds.

If digital beamforming technology is applied to the massive MIMO environment, since signal processing is performed using a baseband processor with respect to several hundreds of antennas for digital signal processing of a transmitter, signal processing complexity is significantly increased. In addition, since RF chains corresponding in number to the number of antennas are required, hardware implementation complexity is significantly increased. In addition, independent channel estimation of all antennas is required and feedback information of a massive MIMO channel composed of all antennas is required in a frequency division duplex (FDD) system, pilot and feedback overhead is significantly increased. In contrast, if analog beamforming technology is applied to the massive MIMO environment, hardware complexity of a transmitter is relatively low, but performance increase due to use of multiple antennas is insignificant and resource assignment flexibility is lowered. In particular, it is difficult to control beam per frequency upon wideband transmission.

Accordingly, in the massive MIMO environment, only one of analog beamforming and digital beamforming is exclusively selected but a method for configuring a hybrid transmitter which is a combination of analog beamforming and digital beamforming is necessary.

Table 1 below shows a relationship between an analog beamforming scheme and a digital beamforming scheme in terms of performance gain and complexity. Based on this, a hybrid transmitter capable of decreasing hardware implementation complexity of the transmitter and maximizing beamforming gain using a massive antenna needs to be designed.

TABLE 1

| | Beamforming accuracy control ease | Multi-carrier beam control | Multi-stream transmission | Hardware complexity | Pilot and feedback overhead |
|---|---|---|---|---|---|
| Analog beamforming scheme | Low | Impossible or difficult | Impossible or difficult | Low | Low |
| Digital beamforming scheme | High | Possible | Possible | High | High |

Hereinafter, hybrid beamforming will be described in greater detail.

Figure 4:
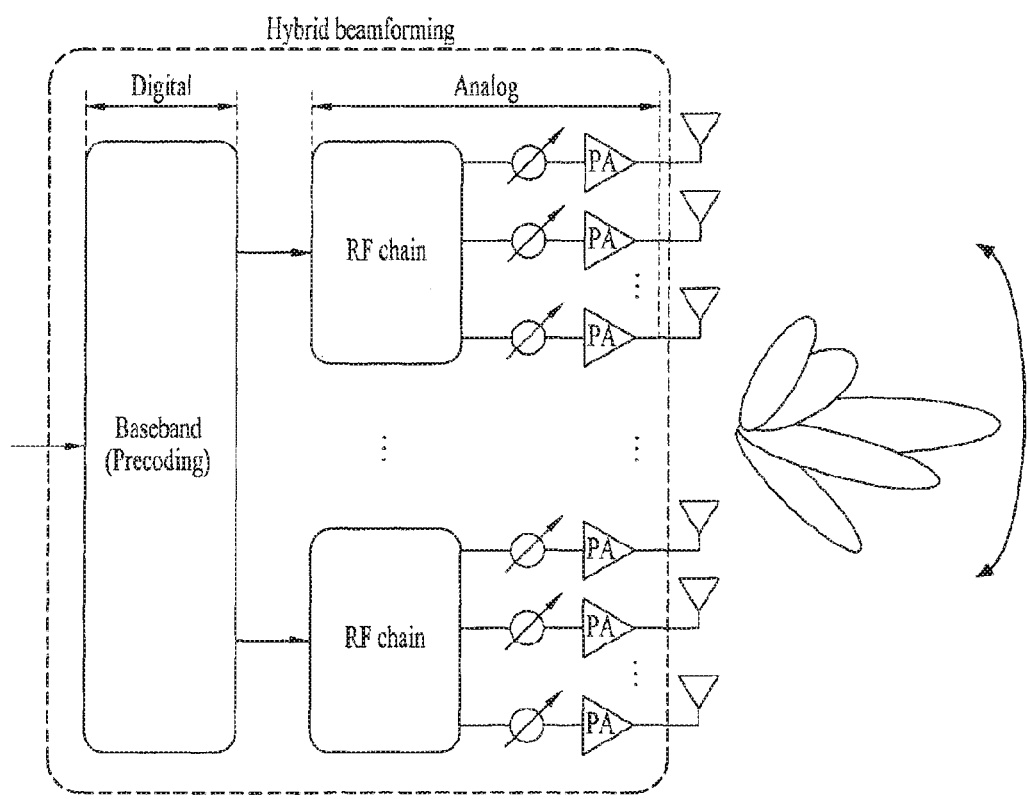
FIG. 4 is a diagram illustrating the concept of hybrid beamforming.

The purpose of hybrid beamforming is to configure a transmitter having merits of an analog beamforming scheme and a digital beamforming scheme while decreasing hardware complexity in a massive MIMO environment. FIG. 4 is a diagram illustrating the concept of hybrid beamforming.

Referring to FIG. 4, in hybrid beamforming, coarse beamforming is performed using an analog beamforming scheme and multi-stream or multi-user transmission is performed using a digital beamforming scheme. As a result, hybrid beamforming is a combination of the analog beamforming scheme and the digital beamforming scheme in order to decrease transmitter implementation complexity or hardware complexity. Fundamentally, technical issues of hybrid beamforming will now be described.

Optimization simultaneously considering analog beamforming and digital beamforming has the following difficulties. Fundamentally, a beamforming scheme is independently applicable according to user using the same time-frequency resources in digital beamforming but a common beamforming scheme should be applied using the same time-frequency resources in analog beamforming. Accordingly, this restricts optimization of the number of supportable ranks, beam control flexibility and beamforming resolution.

In the analog beamforming scheme for forming a beam only in a specific direction using the same time-frequency resources, it is impossible to simultaneously form a plurality of beams in all UE directions. Accordingly, an uplink/downlink control channel, a reference signal, a synchronous signal, etc. cannot be simultaneously transmitted to all UEs distributed in an entire area of a cell.

If analog/digital beam estimation is performed, a digital beam may use an existing orthogonal pilot assignment scheme without change but an analog beam requires a predetermined time-duration corresponding to the number of beam candidates. This means that time delay of analog beam estimation is large and complexity is significantly increased when an analog beam is estimated simultaneously with a digital beam.

Lastly, in the digital beamforming scheme, beamforming for multi-user/stream is freely performed. However, in the analog beamforming scheme, since the same beamforming is performed with respect to an entire transmission band, it is difficult to independently perform beamforming per user or per stream. In particular, since it is difficult to support FDMA (e.g., OFDMA) via orthogonal frequency resource assignment, it is difficult to optimize frequency resource efficiency.

Among the above issues, the object of the present invention is to solve analog/digital beam estimation complexity for hybrid beamforming.

Figure 5:
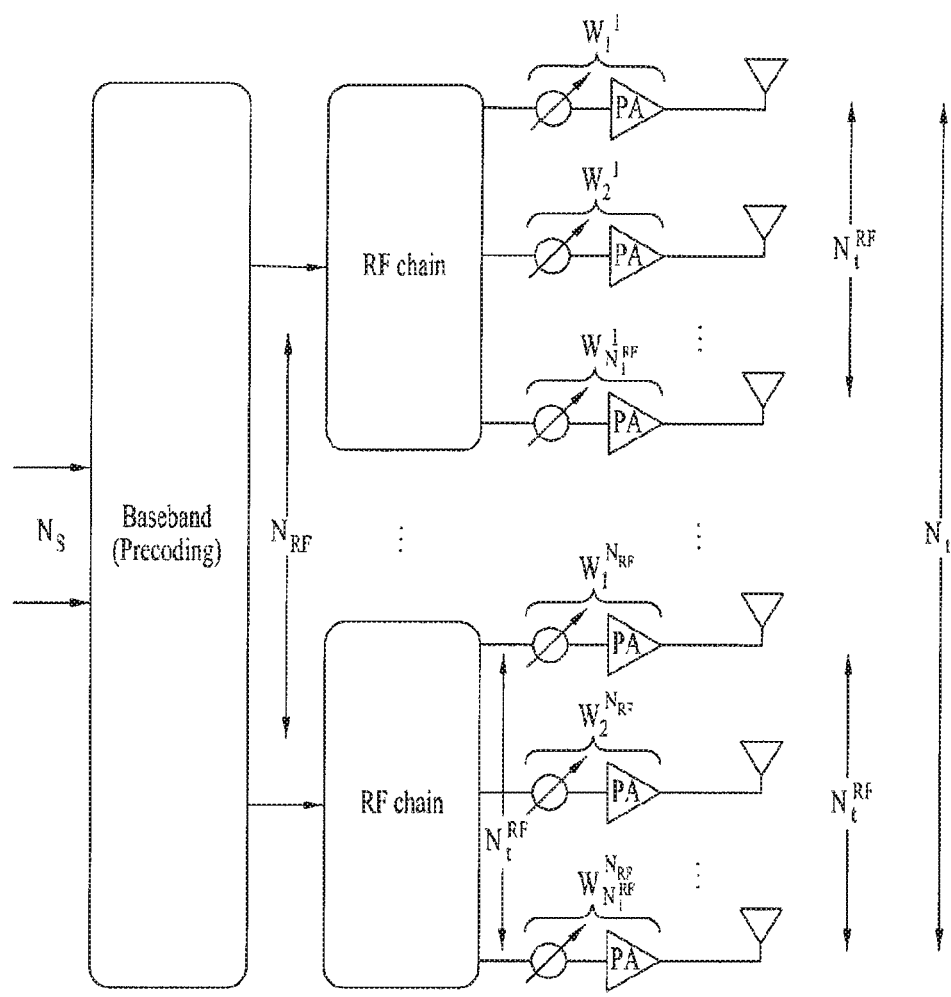
FIG. 5 is a diagram showing the structure of a transmitter for performing hybrid beamforming.

FIG. 5 is a diagram showing the structure of a transmitter for performing hybrid beamforming. In particular, assume that the transmitter for performing hybrid beamforming of FIG. 5 includes only $N_t^{RF}$ independent antennas per RF chain.

In this case, a relationship between the total number of antennas and the number of antennas per RF chain is $N_t = N_t^{RF} \times N_{RF}$. Finally, since a signal passing through a phase shifter and a power amplifier per RF chain is independently sent to a transmit antenna, a system model shown in Equation 8 below may be assumed.

$$y_k = H_k F^{RF} F_k^{BB} s_k + z_k \quad \text{[Equation 8]}$$

In Equation 8, $y_k$ denotes a received signal vector $N_r \times 1$ at a subcarrier having an index k, and $H_k$ denotes an $N_r \times N_t$ channel matrix at a subcarrier having an index k. In addition, $F^{RF}$ means an RF precoder having a size of $N_r \times N_t$ in all subcarriers and, in particular, the RF precoder is equally applied to all subcarriers. Further, $F_k^{BB}$ denotes a baseband precoder having a size of $N_{RF} \times N_S$ at a subcarrier having an index k and, in particular, the baseband precoder may be changed according to subcarrier. Additionally, $s_k$ denotes a transmitted signal vector $N_S \times 1$ at a subcarrier having an index k and $z_k$ denotes a noise signal vector $N_r \times 1$ at a subcarrier having an index k.

In addition, the subcarrier index k has a value of 0 to $N_{FFT} - 1$. Here, $N_{FFT}$ denotes a Fast Fourier Transform (FFT) size and means the total number of subcarriers. In addition, $N_{RF}$ denotes the total number of RF chains, $N_t$ denotes the total number of antennas of the transmitter, and $N_t^{RF}$ denotes the number of transmit antennas included per RF chain. Lastly, $N_r$ denotes the total number of antennas of the receiver and $N_s$ denotes the number of transmitted data streams.

When Equation 8 above is solved for the subcarrier k, Equation 9 below is obtained.

$$\begin{bmatrix} y^{(1)} \\ \vdots \\ y^{(Nr)} \end{bmatrix} = \begin{bmatrix} h_{11} & h_{12} & \cdots & h_{1Nt} \\ h_{21} & h_{22} & \cdots & h_{2Nt} \\ \vdots & \vdots & \ddots & \vdots \\ h_{Nr1} & h_{Nr2} & \cdots & h_{NrNt} \end{bmatrix} \quad \text{[Equation 9]}$$

$$F^{RF} \left( \begin{bmatrix} v_{1,1} & v_{1,2} & \cdots & v_{N_{RF}, N_S} \\ v_{2,1} & v_{2,2} & \cdots & v_{N_{RF}, N_S} \\ \vdots & \vdots & \ddots & \vdots \\ v_{N_{RF},1} & v_{N_{RF},2} & \cdots & v_{N_{RF}, N_S} \end{bmatrix} \begin{bmatrix} x^{(1)} \\ \vdots \\ x^{(N_S - 1)} \end{bmatrix} \right) +$$

$$\begin{bmatrix} z^{(1)} \\ \vdots \\ z^{(Nr)} \end{bmatrix}$$

Here, an equivalent precoding matrix $F^{RF}$ ($N_t \times N_{RF}$) of analog beamforming performed by the phase shifter and the power amplifier after the RF chain is shown in Equation 10 below.

$$F^{RF} = \begin{bmatrix} w^1_{N_t^{RF}} & 0 & 0 & \cdots & 0 \\ 0 & w^2_{N_t^{RF}} & 0 & \cdots & 0 \\ 0 & 0 & w^3_{N_t^{RF}} & \cdots & 0 \\ \vdots & \vdots & \vdots & \ddots & \vdots \\ 0 & 0 & 0 & \cdots & w^{N_{RF}}_{N_t^{RF}} \end{bmatrix}$$ [Equation 10]

In addition, a weight of the RF precoder $F^{RF}$ per RF chain is shown in Equation 11 below.

$$w^j_{N_t^{RF}} = \begin{bmatrix} w^j_1 \\ w^j_2 \\ \vdots \\ w^j_{N_t^{RF}} \end{bmatrix}$$ [Equation 11]

Hereinafter, a beam radiation pattern of hybrid beamforming for a uniform linear array (ULA) antenna will be described. An array response vector of the ULA antenna is shown in Equation 12 below.

$$a(\theta) = \begin{bmatrix} 1 & \exp\left(j2\pi \times 1 \times \frac{d}{\lambda}\sin(\theta)\right) & \exp\left(j2\pi \times 2 \times \frac{d}{\lambda}\sin(\theta)\right) & \cdots & \exp\left(j2\pi \times (N_t - 1) \times \frac{d}{\lambda}\sin(\theta)\right) \end{bmatrix}^T$$ [Equation 12]

In Equation 12, λ denotes wavelength and d denotes a distance between antennas. In order to represent the antenna radiation pattern of the hybrid beamformer, for convenience, assume that the number of RF chains is 4 and the number of analog antennas per RF chain is 4.

Figure 6:
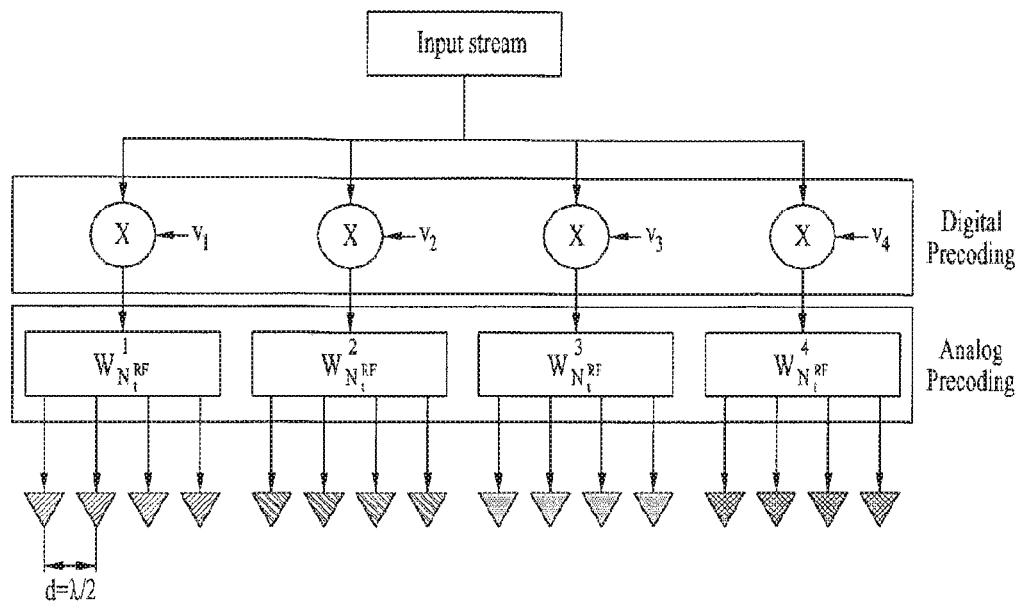
FIG. 6 is a diagram showing a 16-ULA antenna structure composed of 4 RF chains.

FIG. 6 is a diagram showing a 16-ULA antenna structure composed of 4 RF chains. In particular, in FIG. 6, the total number of transmit antennas is 16 and d=λ/2. A phase shifter and a power amplifier of an analog terminal may be expressed by a beamforming weight, that is, a precoder. This is shown in Equation 13 below.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix},$$ [Equation 13]

$$w^j_{N_t^{RF}} = \begin{bmatrix} w^j_1 \\ w^j_2 \\ w^j_3 \\ w^j_4 \end{bmatrix}$$

In order to derive a beam pattern in a boresight direction, that is, in a center direction of a main lobe of a wave radiated from antenna, a beam shift angle is set to 0°. Accordingly, all weight vectors of an analog precoding matrix have an element having a value of 1. At this time, an arbitrary weight vector of rank 1 applied in a digital beamforming stage is defined as shown in Equation 14 below.

$$F^{BB} = v_1 = [v_1 v_2 v_3 v_4]^T$$ [Equation 14]

In a boresight direction (θ=0°), an antenna array response vector to which digital beamforming of Equation 13 is applied may be expressed by Equation 15. At this time, assume that the distance d between antennas is λ/2.

$$\sum a(\theta) =$$ [Equation 15]

$$\sum_{i=0}^{15} a_i(\theta) = (1 + \exp(j\pi \times \sin(\theta)) + \exp(j\pi 2 \times \sin(\theta)) +$$

$$\exp(j\pi 3 \times \sin(\theta))) \times v_1 +$$

$$(\exp(j\pi 4 \times \sin(\theta)) + \exp(j\pi 5 \times \sin(\theta)) +$$

$$\exp(j\pi 6 \times \sin(\theta)) + \exp(j\pi 7 \times \sin(\theta))) \times v_2 +$$

$$(\exp(j\pi 8 \times \sin(\theta)) + \exp(j\pi 9 \times \sin(\theta)) +$$

$$\exp(j\pi 10 \times \sin(\theta)) + \exp(j\pi 11 \times \sin(\theta))) \times v_3 +$$

$$(\exp(j\pi 12 \times \sin(\theta)) + \exp(j\pi 13 \times \sin(\theta)) +$$

$$\exp(j\pi 14 \times \sin(\theta)) + \exp(j\pi 15 \times \sin(\theta))) \times v_4$$

From Equation 15 above, the result shown in Equation 16 below may be derived.

$$\sum a(\theta) = \begin{pmatrix} 1 + \exp(j\pi\sin(\theta)) + \\ \exp(j\pi 2\sin(\theta)) + \\ \exp(j\pi 3\sin(\theta)) \end{pmatrix} \times$$ [Equation 16]

$$\begin{pmatrix} v_1 + \exp(j\pi 4\sin(\theta)) \cdot \\ v_2 + \exp(j\pi 8\sin(\theta)) \cdot \\ v_3 + \exp(j\pi 12\sin(\theta)) \cdot v_4 \end{pmatrix}$$

$$= \left(\sum_{i=1}^{4} s_i\right) \times \left(\sum_{i=1}^{4} t_i\right)$$

-continued $$= \sum s \times \sum t$$

In Equation 16, s denotes a beam bound vector, which is expressed by Equation 17 below. In addition, t denotes a beam gain/adjustment vector, which is expressed by Equation 18 below.

$$s = \begin{bmatrix} 1 \\ e^{j\pi \sin(\theta)} \\ e^{j\pi 2\sin(\theta)} \\ e^{j\pi 3\sin(\theta)} \end{bmatrix}$$ [Equation 17]

$$t = \begin{bmatrix} 1 & 0 & 0 & 0 \\ 0 & e^{j\pi 4\sin(\theta)} & 0 & 0 \\ 0 & 0 & e^{j\pi 8\sin(\theta)} & 0 \\ 0 & 0 & 0 & e^{j\pi 12\sin(\theta)} \end{bmatrix} \begin{bmatrix} v_1 \\ v_2 \\ v_3 \\ v_4 \end{bmatrix}$$ [Equation 18]

Here, the beam bound vector s determines an entire valid range. In addition, a digital beamforming range is also restricted to this range.

Figure 7:
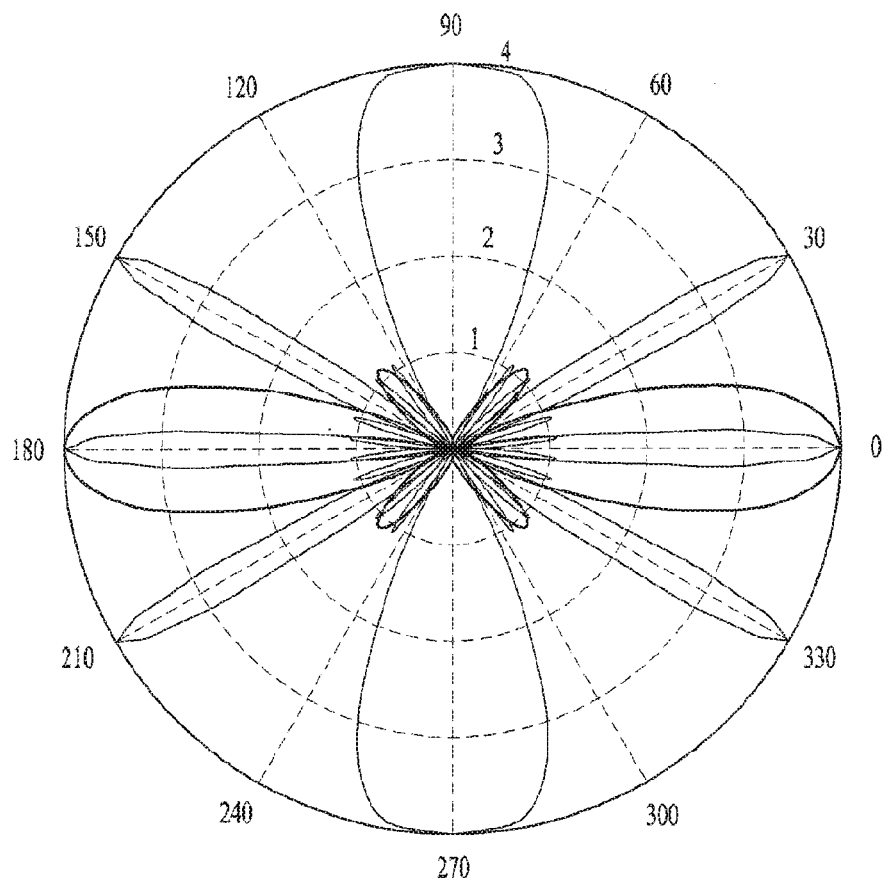
FIG. 7 is a diagram showing beam patterns of a beam bound vector and a beam adjustment vector.

FIG. 7 is a diagram showing beam patterns of a beam bound vector and a beam adjustment vector. In particular, in FIG. 7, assume that $N_t=16$, $N_t^{RF}=4$, $N_{RF}=4$. The beam pattern of the beam bound vector is denoted by a thick line and the beam pattern of the beam adjustment vector is denoted by a thin line.

Figure 8:
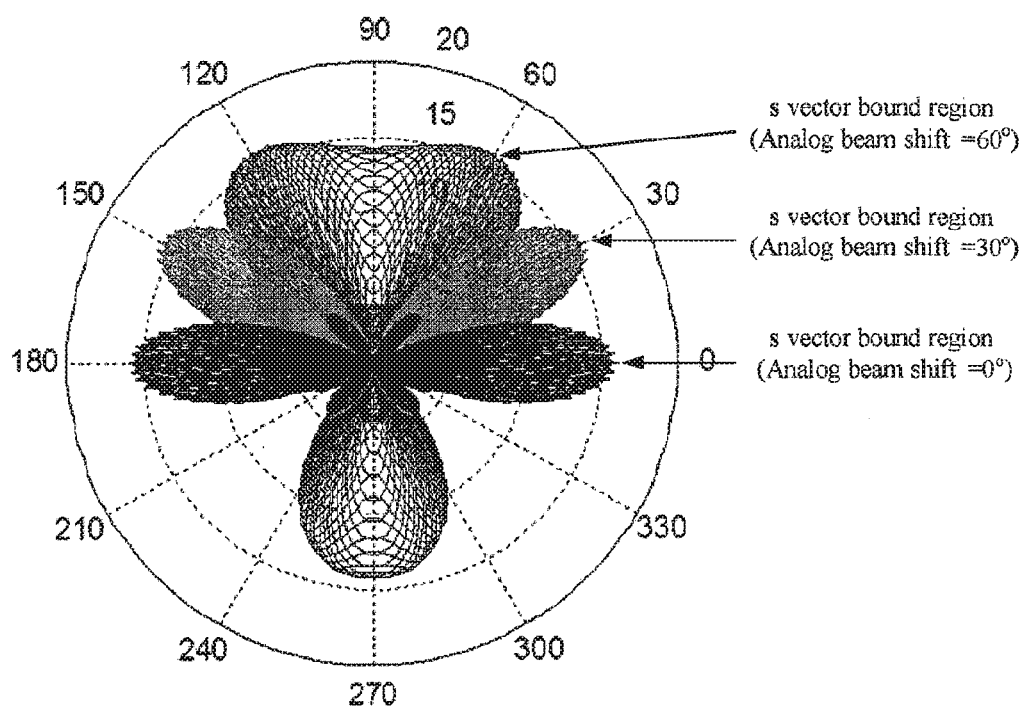
FIG. 8 is a diagram showing a beam pattern of a final antenna array response vector according to analog beam shift.

FIG. 8 is a diagram showing a beam pattern of a final antenna array response vector according to analog beam shift. Similarly, assume that $N_t=16$, $N_t^{RF}=4$, $N_{RF}=4$. An accumulated beam pattern result, to which $v_1=[v_1\ v_2\ v_3\ v_4]^T$ for determining digital beamforming is applied, is shown.

Referring to FIGS. 7 and 8, it can be seen that the valid range of the beam is restricted to the beam bound vector s.

As described above, $F^{RF}$ is fixed to determine beamforming of an analog stage in a specific direction and, although $F^{BB}=v$ is applied to digital beamforming, a beam pattern is restricted to the beam bound vector s. Accordingly, a UE can estimate an accurate direction via a difference between reference beam gain and beam gain obtained by a bounded beam.

In the present invention, a fast analog beam scanning method capable of decreasing beam scanning complexity for analog beamforming and a search time will be described. In general, as a transmission and reception structure used for analog beamforming, a pure analog beamforming transmitter and receiver or a hybrid beamforming transmitter and receiver may be considered. In general, analog beam scanning may estimate one beam at the same time. Accordingly, a training time necessary for beam scanning is proportional to the total number of candidate beams.

As described above, pure analog beamforming requires a beam scanning process in the time domain for beam estimation of the transmitter and the receiver. That is, for analog beam estimation, a time corresponding to the number $K_T \times K_R$ of beams of each transmission/reception is required. If the analog beam estimation process is finished, the UE may feed a beam ID having highest signal strength back to an eNB.

When a time $t_s$ is required for one beam scanning process, an estimated time $T_s$ of all transmitted/received beams may be expressed by Equation 19 below.

$$T_S = t_s \times (K_T \times K_R)$$ [Equation 19]

Referring to Equation 19, if it is assumed that the total number of transmitted beams is $K_T = L$ and the number of received beams is $K_T = 1$, the total number of candidate beams is L. Thus, L time durations are required in the time domain.

Figure 9:
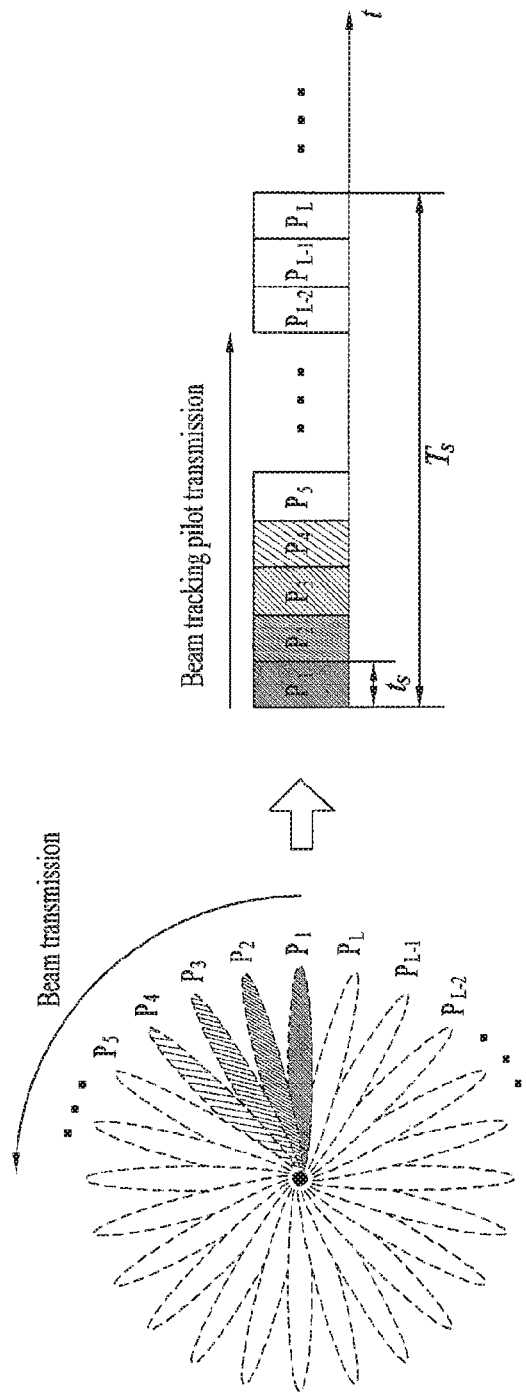
FIG. 9 is a diagram showing a beam estimation duration in a time domain required for analog beam tracking.

FIG. 9 is a diagram showing a beam estimation duration in a time domain required for analog beam tracking.

Referring to FIG. 9, it can be seen that only one beam may be estimated in a single time duration for analog beam estimation and L time durations are required for estimation of a total of L beams. That is, as the number of individual beams is increased due to increase in number of transmit/receive antennas, a training time is increased.

Accordingly, in analog beamforming, since the size of a continuous waveform in the time domain and a phase angle are changed after a DAC, a training duration of an individual beam should be guaranteed unlike digital beamforming. As this duration is increased, system throughput loss is increased. If UE mobility and channel change are added, system throughput loss upon beam scanning may be further increased.

In an analog beamforming stage of the hybrid beamformer, which requires a beam training duration, a training time is increased in proportion to the size of a search space of a beam. Since a sharper beam is expected to be generated due to increase in number of physical antennas of a transmitter/receiver in the future, if a transmission/reception beam width and antenna structures from an existing 2D channel to a 3D channel are considered, the search space of the beam is further increased as shown in Table 2 below.

TABLE 2

| | Beamwidth | 1° | 2° | 5° | 10° |
|---|---|---|---|---|---|
| 2D | Search space | 360 | 180 | 72 | 36 |
| | Exhaustive candidates (Tx beam + Rx beam) | $360^2$ | $180^2$ | $72^2$ | $36^2$ |
| 3D | Search space | 129,600 | 32,400 | 5,184 | 1,296 |
| | Exhaustive candidates (Tx beam + Rx beam) | $129,600^2$ | $32,400^2$ | $5,184^2$ | $1,296^2$ |

In addition, a coarse beam training time, that is, a search time, according to increase in search space is estimated as follows. In Table 3 below, only a 2D channel is shown for convenience of description. Referring to Table 3 below, if the size of the search space is increased 10 fold, the search time is increased 100 fold.

TABLE 3

| | Beamwidth | 1° | 2° | 5° | 10° |
|---|---|---|---|---|---|
| 2D | Search space (Tx beam + Rx beam) | 720 | 360 | 144 | 72 |
| | Exhaustive search time | 5.37 s | 1.34 s | 215.0 ms | 53.8 ms |

Based on the above description, hereinafter, a fast analog beam scanning method capable of beam scanning complexity for analog beamforming and a search time will be proposed.

First, in order to decrease an analog beam scanning time, an analog beamforming coefficient is derived based on a beam gain difference without scanning a beam ID or PMI. More specifically, a method for shortening a beam training time by decreasing a search space of a beam is proposed.

Fundamentally, if the number of physical antennas is increased, beam gain is increased $10 \log_{10} M$ fold in proportion to the number M of antennas, but beam resolution is also increased. As described above, if the beam becomes sharper, a significant analog beam training time is required in both transmission and reception beamformers. That is, if significant loss occurs due to analog beam training prior to any processing in a digital stage, final gain of hybrid beamforming is rapidly decreased.

Figure 10:
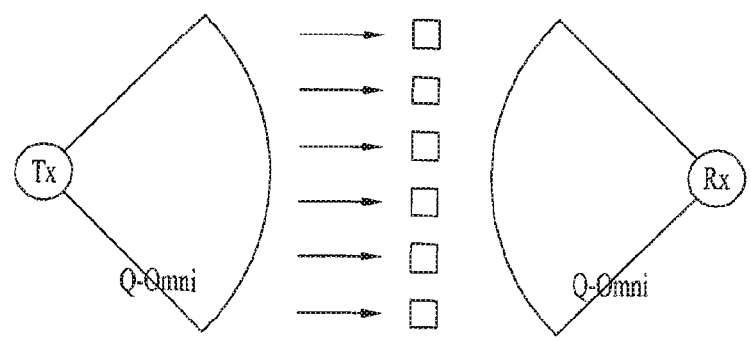
FIG. 10 is a diagram showing an example of beam transmission of an omni pattern (or quasi-omni pattern) according to an embodiment of the present invention.

1) First, an eNB, that is, a transmitter, transmits a beam of an omni pattern or a beam of a quasi-omni pattern initially or at a long period to enable a UE, that is, a receiver, to acquire reference signal strength. FIG. 10 is a diagram showing an example of beam transmission of an omni pattern (or quasi-omni pattern) according to an embodiment of the present invention.

This process is first performed once during a beam scanning process or the beam may be intermittently transmitted at a long period or when reference signal received power (RSRP) or an SINR value of the UE is changed to a reference value or more.

2) Next, the eNB, that is, the transmitter, performs beam scanning per sector level and the UE, that is, the receiver, feeds a beam gain difference between a beam of an omni pattern (or a quasi-omni pattern) and a reference signal back to the eNB along with sector beam information.

Figure 11:
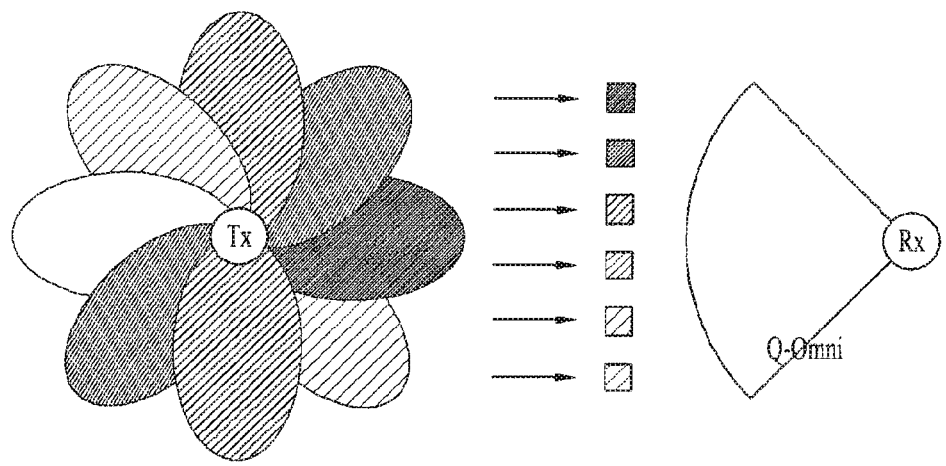
FIG. 11 is a diagram showing a beam scanning method per sector level according to an embodiment of the present invention.

FIG. 11 is a diagram showing a beam scanning method per sector level according to an embodiment of the present invention.

Referring to FIG. 11, a transmitter first transmits a coarse beam of a sector level. At this time, a restricted number of sector beams is preferably transmitted to cover all directions. A receiver searches for a sector, in which the level of the received beam is highest, and calculates a difference between the strength of the received beam of the omni pattern (or the quasi-omni pattern) and the received signal strength based on the signal strengths of simultaneously detected sector beams.

The transmission/reception scanning process for beam scanning is finished. The beam training time is no longer necessary via the above-described steps. However, the receiver performs a process of estimating and feeding the beam gain difference back to the eNB along with sector beam information (or beam ID) having highest reception gain.

Figure 12:
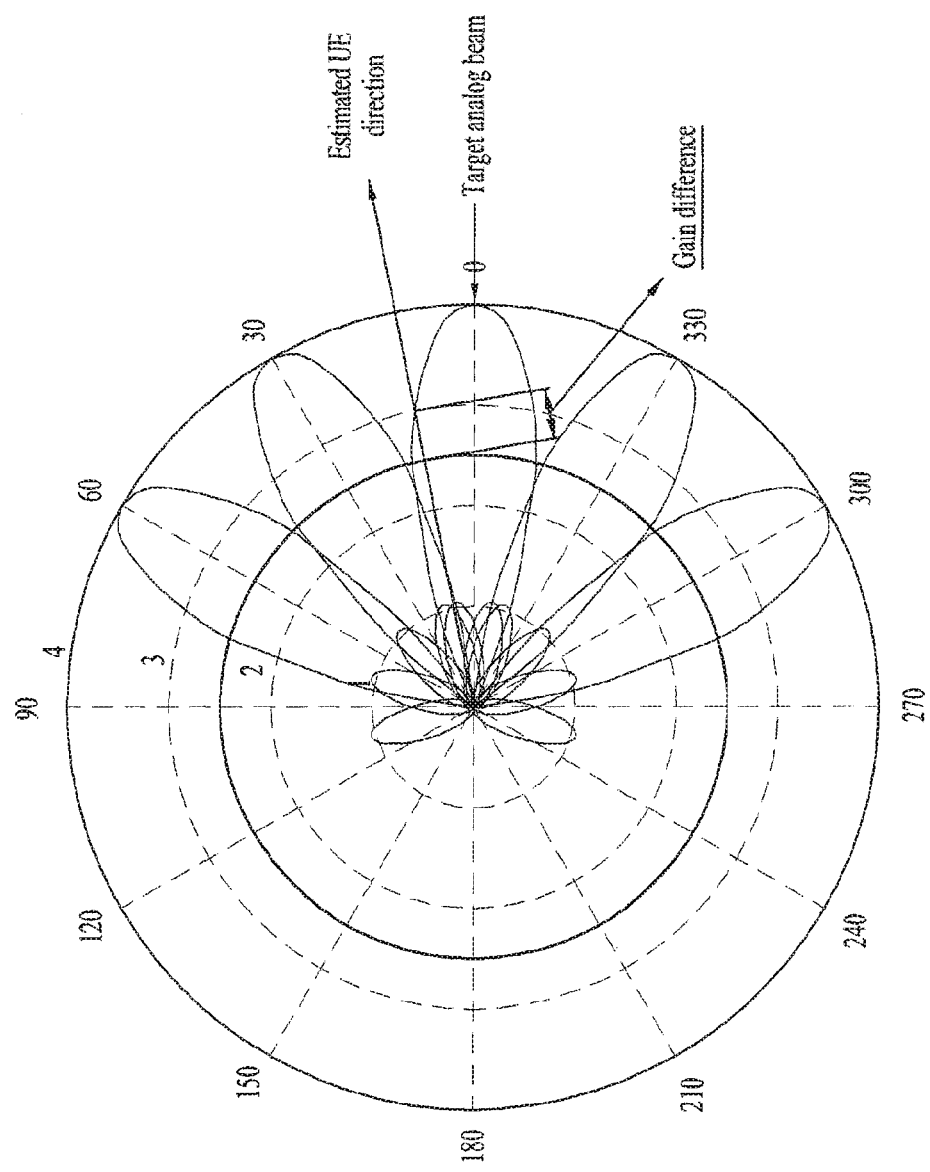
FIG. 12 is a diagram showing a gain difference derivation method of a user equipment (UE) according to an embodiment of the present invention.

FIG. 12 is a diagram showing a gain difference derivation method of a user equipment (UE) according to an embodiment of the present invention.

Referring to FIG. 12, the UE may calculate a difference between the strength of the received beam of the omni pattern (or the quasi-omni pattern) and the received signal strength according to Equation 20 below.

$$G_{diff}=G_{mea}-G_{ref}(\text{dB})$$ [Equation 20]

3) Next, the eNB directly derives an analog beamforming coefficient using the analog beam information and beam gain difference information fed back from the UE, which will be described with reference to the drawings.

Figure 13:
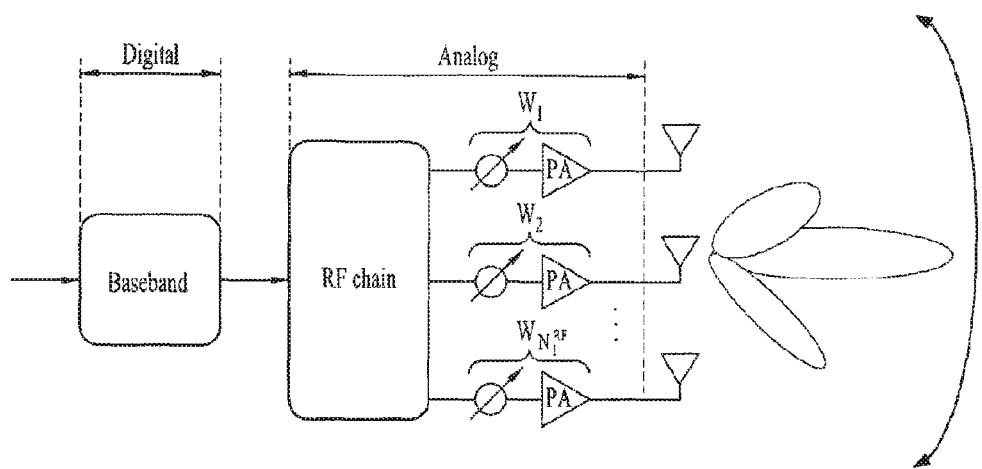
FIG. 13 is a diagram showing the setting concept of an analog beam coefficient according to an embodiment of the present invention.

FIG. 13 is a diagram showing the setting concept of an analog beam coefficient according to an embodiment of the present invention. Hereinafter, a method for setting an analog coefficient value such as a phase shifter (PS) and power amplifier (PA) value for analog beam control based on a beam gain difference fed back from the UE will be described.

The analog beam coefficient may be expressed by an equivalent precoding weight and is shown in Equation 21 below.

$$P_i = w^j_{N^{RF}_t} = \begin{bmatrix} w^j_1 \\ w^j_2 \\ \vdots \\ w^j_{N^{RF}_t} \end{bmatrix}$$ [Equation 21]

In Equation 21, $P_i$ denotes PMI indicating an analog precoding weight. A final analog precoding weight is derived using a beam ID or a sector ID and a beam gain difference $G_{diff}$ fed back from the UE.

That is, it is possible to accurately estimate the location of the UE within the analog beam selected based on the gain difference fed back from the UE. Analog beamforming PMI is selected such that a final beam subjected to hybrid beamforming is coincident with the location of the UE. For example, an example of selecting PMI according to the beam gain difference $G_{diff}$ is shown in Table 4 below.

TABLE 4

| Analog beam index (beam ID) | Gain difference (dB) | PMI |
|---|---|---|
| Beam ID #1 | $G_1$ | $P_1$ |
|  | $G_2$ | $P_2$ |
|  | . | . |
|  | . | . |
|  | . | . |
|  | $G_L$ | $P_L$ |
| Beam ID #2 | $G_1$ | $P_{L+1}$ |
|  | $G_2$ | $P_{L+2}$ |
|  | . | . |
|  | . | . |
|  | . | . |
|  | $G_L$ | $P_{2L}$ |
| . | . | . |
| . | . | . |
| . | . | . |

Figure 14:
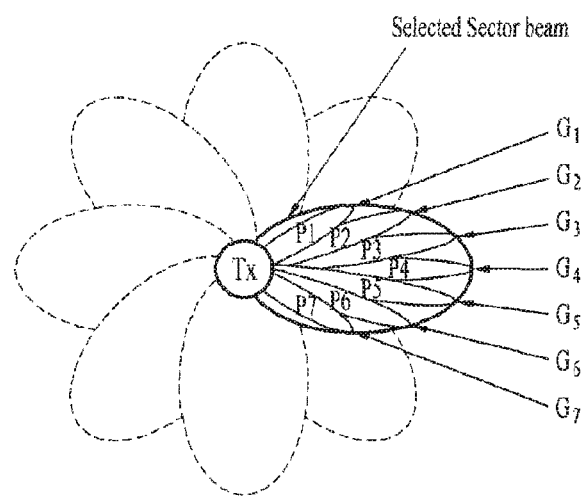
FIG. 14 is a diagram showing an example of deriving analog beamforming PMI based on a beam gain difference according to an embodiment of the present invention.

FIG. 14 is a diagram showing an example of deriving analog beamforming PMI based on a beam gain difference according to an embodiment of the present invention.

Referring to FIG. 14, the eNB may select PMI for a final beam using a beam gain difference $G_{diff}$ within a beam sector ID received from the UE. Accordingly, the eNB may extract an analog beamforming weight of an analog beamformer and set a PS and PA value based on the analog beamforming weight.

In order to reduce feedback burden of the beam gain difference or if it is difficult to accurately determine PMI using the beam gain difference alone, for example, in a not-line of sight (NLOS) environment, an environment in which Doppler effect is significant, an environment in which the density of a reference beam is low, etc., the beam gain difference may correspond to a plurality of PMI as shown in Table 5 below.

TABLE 5

| Analog beam index (beam ID) | Gain difference (dB) | PMI |
|---|---|---|
| Beam #1 (Boresight = 0°) | $G_1$ | $\{P_1, P_2\}$ |
|  | $G_2$ | $\{P_2, P_3\}$ |
|  | . | . |

TABLE 5-continued

| Analog beam index (beam ID) | Gain difference (dB) | PMI |
|---|---|---|
| | . | . |
| | . | . |
| | $G_L$ | $\{P_L, P_{L+1}\}$ |
| Beam #2 | $G_1$ | $\{P_{L+1}, P_{L+2}\}$ |
| (Boresight = 30°) | $G_2$ | $\{P_{L+2}, P_{L+3}\}$ |
| | . | . |
| | . | . |
| | $G_L$ | $\{P_{2L}, P_{2L+1}\}$ |
| . | . | . |
| . | . | . |
| . | . | . |

Although it is assumed that the transmitter is an eNB in the above description, the same procedure is repeated even when the UE transmits data in uplink.

If the transmitter/receiver includes a 2D array antenna, that is, if three-dimensional (3D) beamforming is performed, the same beam scanning process is divided into a horizontal plane and a vertical plane and is individually performed.

Figure 15:
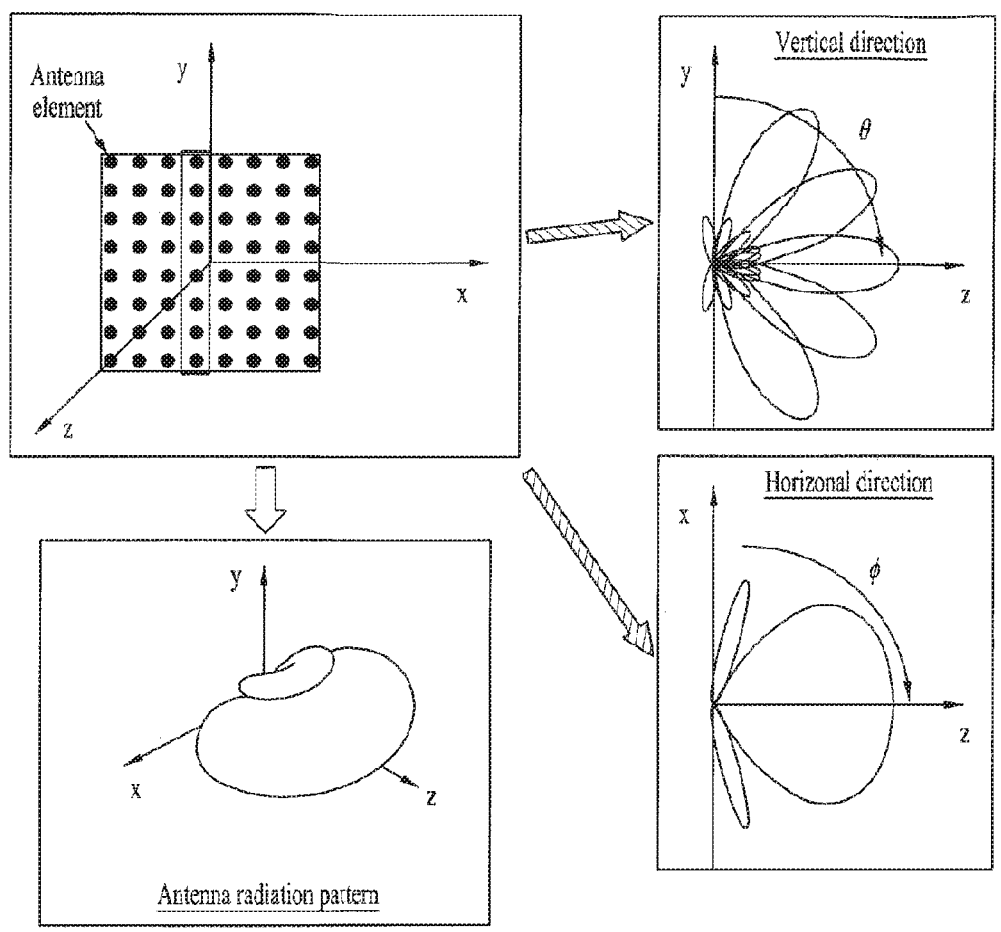
FIG. 15 is a diagram showing a horizontal beam pattern shape upon vertical beamforming in a two-dimensional (2D) array antenna according to an embodiment of the present invention.
Figure 16:
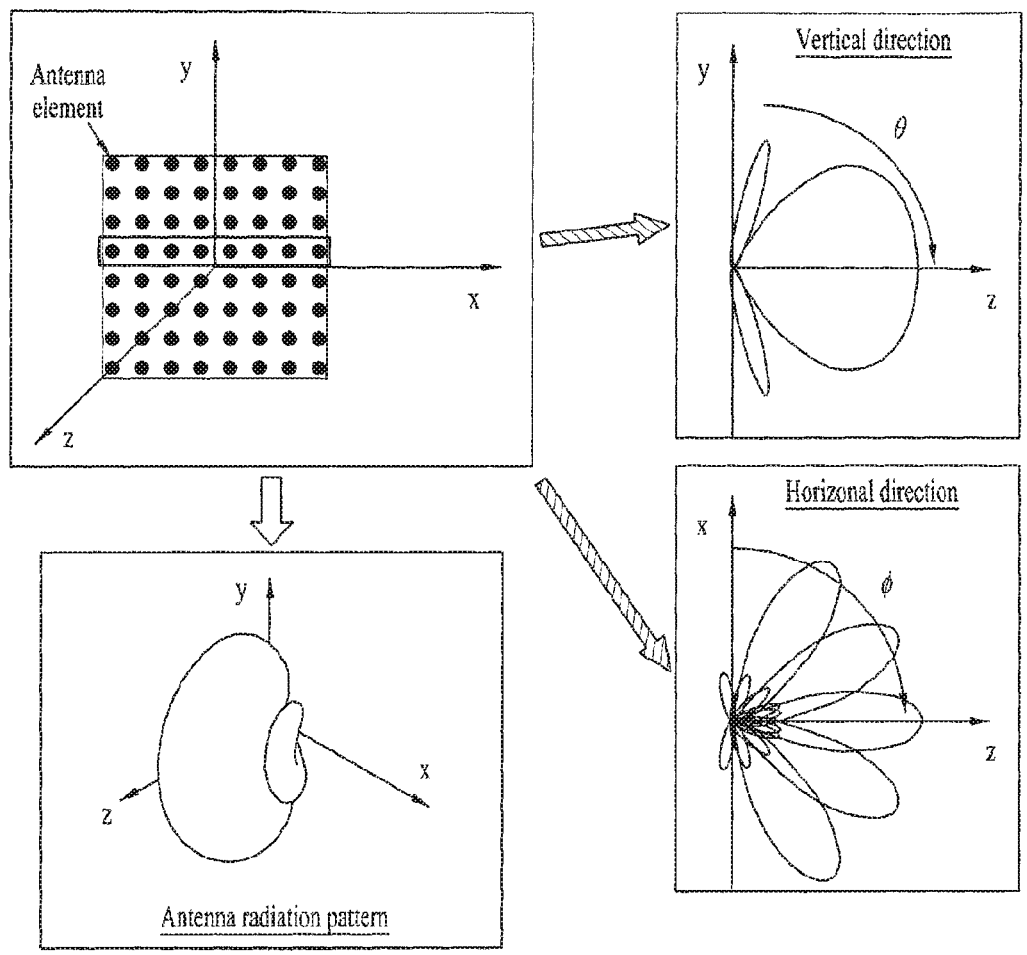
FIG. 16 is a diagram showing a vertical beam pattern shape upon horizontal beamforming in a 2D array antenna according to an embodiment of the present invention.

FIG. 15 is a diagram showing a horizontal beam pattern shape upon vertical beamforming in a two-dimensional (2D) array antenna according to an embodiment of the present invention. FIG. 16 is a diagram showing a vertical beam pattern shape upon horizontal beamforming in a 2D array antenna according to an embodiment of the present invention.

More specifically, a 3D channel is different from a 2D channel in that a horizontal omni pattern and a vertical omni pattern (or quasi-omni pattern) are generated. In the 3D channel, for beam transmission of the omni pattern (or the quasi-omni pattern), a horizontal omni pattern (or quasi-omni pattern) is generated using a vertical beam pattern as shown in FIG. 16 and a vertical omni pattern (or quasi-omni pattern) is generated using a horizontal beam pattern as shown in FIG. 15. Thereafter, vertical PMI/horizontal PMI is calculated using the beam gain difference.

According to the present invention, since the number of objects subjected to beam scanning is decreased, it is possible to remarkably decrease a beam training time for analog beam scanning.

Although the proposed method is described based on a downlink scenario for transmitting a signal from an eNB to a UE, the present invention is not limited thereto. This technology is applicable to an arbitrary combination of a transmitter and a receiver. For example, the present invention is applicable to an uplink transmission scenario in which a UE transmits a signal to an eNB, an inter-UE signal transmission scenario, or an inter-eNB signal transmission scenario.

Figure 17:
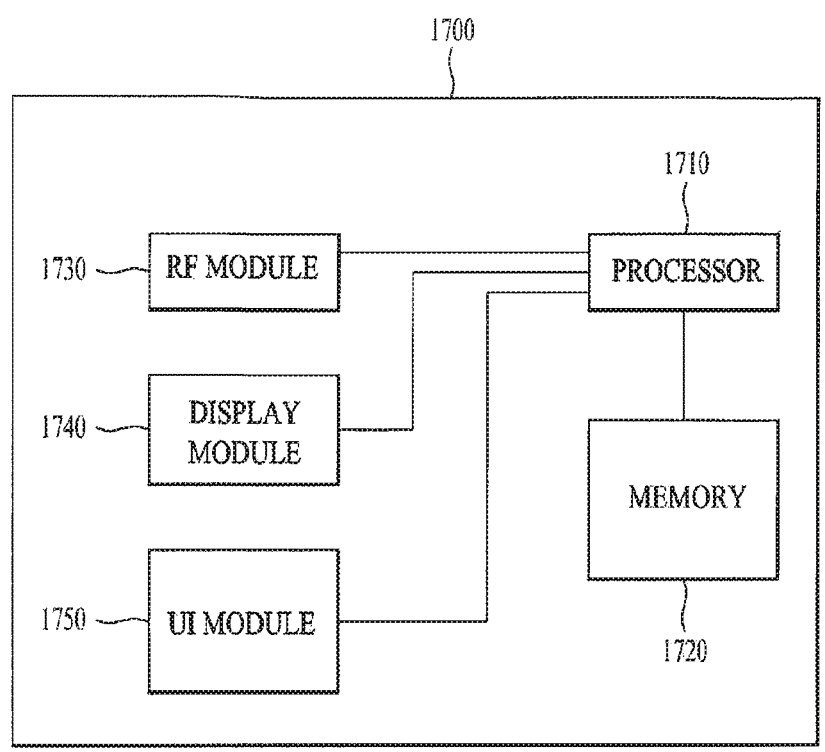
FIG. 17 is a block diagram showing a communication apparatus according to one embodiment of the present invention.

FIG. 17 is a block diagram showing a communication apparatus according to one embodiment of the present invention.

Referring to FIG. 17, a communication apparatus 1700 includes a processor 1710, a memory 1720, a Radio Frequency (RF) module 1730, a display module 1740 and a user interface module 1750.

The communication apparatus 1700 is shown for convenience of description and some modules thereof may be omitted. In addition, the communication apparatus 1700 may further include necessary modules. In addition, some modules of the communication apparatus 1700 may be subdivided. The processor 1710 is configured to perform an operation of the embodiment of the present invention described with reference to the drawings. For a detailed description of the operation of the processor 1710, reference may be made to the description associated with FIGS. 1 to 16.

The memory 1720 is connected to the processor 1710 so as to store an operating system, an application, program code, data and the like. The RF module 1730 is connected to the processor 1710 so as to perform a function for converting a baseband signal into a radio signal or converting a radio signal into a baseband signal. The RF module 1730 performs analog conversion, amplification, filtering and frequency up-conversion or inverse processes thereof. The display module 1740 is connected to the processor 1710 so as to display a variety of information. As the display module 1740, although not limited thereto, a well-known device such as a Liquid Crystal Display (LCD), a Light Emitting Diode (LED), or an Organic Light Emitting Diode (OLED) may be used. The user interface module 1750 is connected to the processor 1710 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, the embodiments of the present invention have been described centering on a data transmission and reception relationship between a UE and a BS. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting a signal to a receiver in a wireless communication system, the method performed by a transmitter and comprising:
   transmitting a first reference signal to the receiver for omni-directionally providing a uniform reference beam if a channel quality change of the receiver is equal to or greater than a threshold;
   transmitting a second reference signal to the receiver for providing beams corresponding to each of a predetermined number of sectors;
   receiving sector information and gain information from the receiver, the sector information selected based on the second reference signal and the gain information related to a beam gain difference between a beam of the provided beams corresponding to a selected sector of the predetermined number of sectors and the uniform reference beam; and
   performing beamforming for transmitting the signal to the receiver based on the received sector information and gain information.

2. The method according to claim 1, wherein performing the beamforming includes:
   calculating predetermined precoding matrices based on the received sector information; and
   selecting one of the predetermined precoding matrices based on the received gain information.

3. The method according to claim 2, wherein the predetermined precoding matrices are used to adjust a phase shifter and a power amplifier in an antenna of the transmitter.

4. The method according to claim 1, wherein the beam corresponding to the selected sector provides maximum beam gain among the beams corresponding to each of the predetermined number of sectors.

5. A method for receiving a signal from a transmitter in a wireless communication system, the method performed by a receiver and comprising:
   transmitting information related to a channel quality change to the transmitter;
   receiving a first reference signal from the transmitter for omni-directionally providing a uniform reference beam if the channel quality change is equal to or greater than a threshold; and
   receiving a second reference signal from the transmitter for providing beams corresponding to each of a predetermined number of sectors;
   selecting one of the predetermined number of sectors based on the received first reference signal and second reference signal;
   calculating a beam gain difference between a beam of the provided beams corresponding to the selected sector and the uniform reference beam;
   transmitting information related to the selected sector and information related to the calculated beam gain difference to the transmitter; and
   receiving the signal from the transmitter, the signal subjected to beamforming based on the information related to the selected sector and the information related to the calculated beam gain difference.

6. The method according to claim 5, wherein the signal subjected to beamforming is a signal to which one of a plurality of predetermined precoding matrices is applied, the one of a plurality of predetermined precoding matrices selected based on the information related to the calculated beam gain difference from among predetermined precoding matrices calculated based on the information related to the selected sector.

7. The method according to claim 6, wherein the predetermined precoding matrices are related to adjusting a phase shifter and a power amplifier included in an antenna of the transmitter.

8. The method according to claim 5, wherein selecting one of the predetermined number of sectors includes selecting a beam providing maximum beam gain among the beams corresponding to each of the predetermined number of sectors.

* * * * *